Oct. 26, 1965 J. E. FOSTER 3,214,675
PERMANENT MAGNET GENERATOR WITH AUTOMATIC VOLTAGE REGULATION
Filed Jan. 5, 1959 2 Sheets-Sheet 1
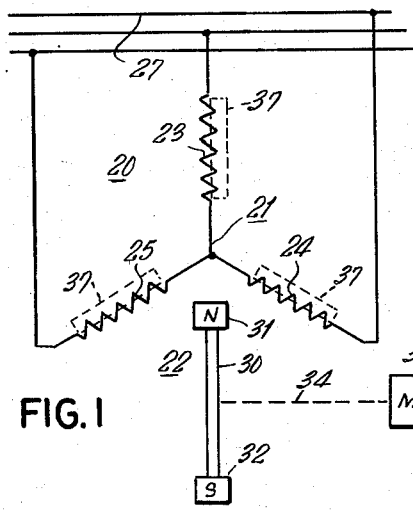
FIG. 1
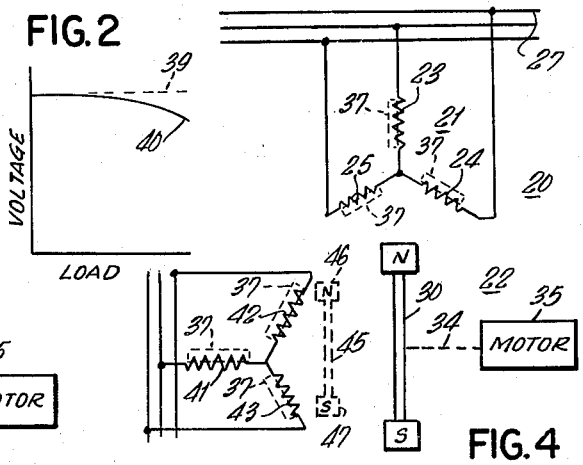
FIG. 2
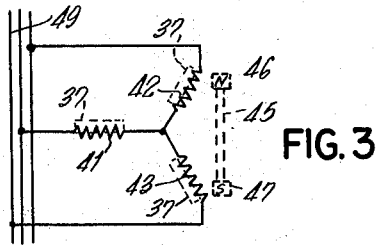
FIG. 3
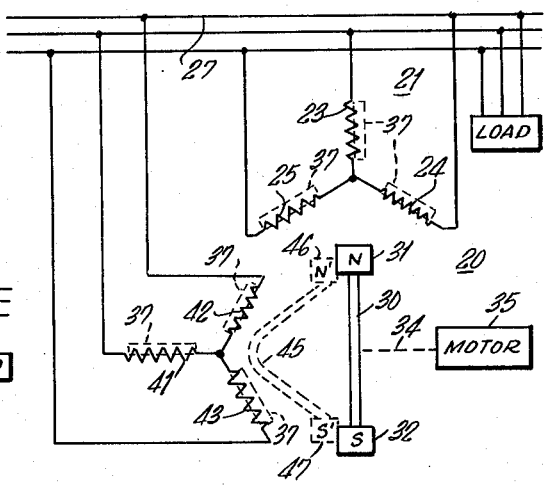
FIG. 4
FIG. 5
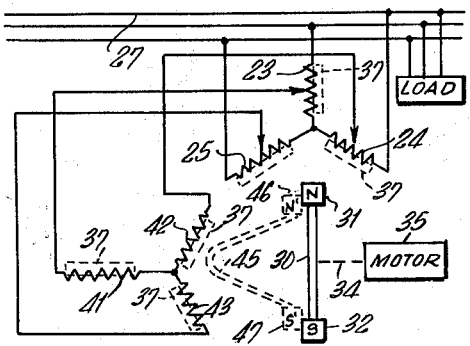
FIG. 6
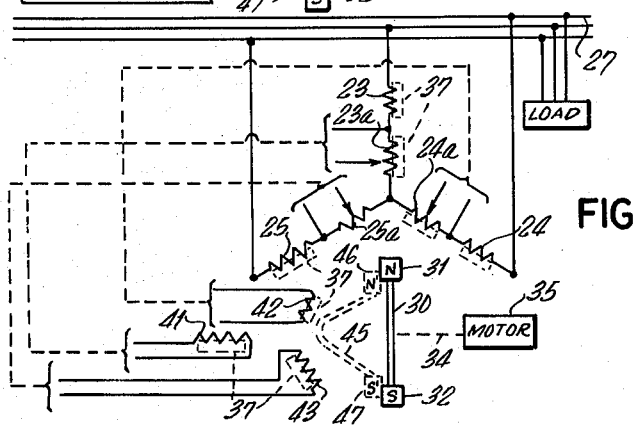
FIG. 7
INVENTOR.
Julius E. Foster Oct. 26, 1965    J. E. FOSTER    3,214,675
PERMANENT MAGNET GENERATOR WITH AUTOMATIC VOLTAGE REGULATION
Filed Jan. 5, 1959    2 Sheets-Sheet 2

MAGNETIC FOIL SATURABLE BY FLUX HARMONICS

INVENTOR.

United States Patent Office 3,214,675
Patented Oct. 26, 1965

3,214,675
PERMANENT MAGNET GENERATOR WITH
AUTOMATIC VOLTAGE REGULATION
Julius E. Foster, Rutherford, N.J.
(2431 Webb Ave., Bronx, N.Y.)
Filed Jan. 5, 1959, Ser. No. 784,969
21 Claims. (Cl. 322—46)

This invention relates to dynamo-electric machines, and to permanent magnet generators particularly, in which a novel construction and method of operation are provided to develop an auxiliary magnetic flux field to supplement the main flux field, as from the permanent magnets, to establish an effective compounding action to maintain the generator terminal voltage near no-load value, and to regulate the induced internal voltage as a function of the load on the generator.

In a conventional permanent magnet generator, the stator or armature windings are disposed in regular polyphase arrangement, and a permanent magnet is rotated as a multi-pole salient-pole rotor in a path adjacent those windings to generate polyphase voltages in those stator windings.

When a connected load demands energy, the current in the stator or output windings creates a magneto-motive force that reacts with the flux field from the rotating rotor field pole, to change the strength, form and position of the flux field from the rotating field pole.

Where the rotating field is generated by an electromagnetic field pole structure with an energizing winding, the current to the field winding may be increased from an external source, as necessary, to provide the increased flux to energize the output windings when the load increases the output current demand.

However, where a permanent magnet rotor is used for the rotating field, the quantity of flux available from the magnet is fixed and cannot be increased by any supplemental magnetization of the magnet, when the load is increased.

Consequently, the armature reaction in a permanent magnet generator reduces the quantity of field flux effectively acting on the armature or output windings from the rotating magnet. The result is that the reduced flux field generates a smaller voltage in the output windings, and the terminal voltage of the generator droops to a value that is insufficient to operate the load equipment to which the alternator is to supply operating energy.

The primary object of this invention is to provide a permanent magnet generator of novel construction, in which an auxiliary rotating magnetic flux field is generated to supplement the rotated flux field of the permanent magnet so the terminal voltage of the generator will be maintained and will be adequate to operate the load equipment connected to the generator.

Another object of this invention is to provide a novel permanent magnet generator design in which the rotated magnet field flux is supplemented by an auxiliary rotating field that is a function of the load current.

Another object of this invention is to provide a novel permanent magnet generator design in which the flux leakage in the stator slots as caused by armature reaction of the current in the stator windings, shall be replaced by flux from an auxiliary flux field in order to maintain the armature voltage within certain limits near no-load voltage.

Another object of this invention is to provide an improved permanent magnet generator with self-regulating features to maintain its terminal voltages, and with design features to suppress harmonics in the magnetic flux fields, so the conventional losses will be reduced and the efficiency of the generator increased.

A further object of this invention is to provide a permanent magnet generator in which the harmonic fluxes are kept out of the main magnetic flux conductors so their saturating effects on the magnetic flux core structures will be prevented, and so the maximum benefit may be had of the limited supply of flux from the permanent magnet.

The invention is applied in a permanent magnet generator by arranging an auxiliary set of stator cores with teeth to provide a parallel flux path adjacent the main stator teeth, to add to the main flux cutting each phase coil side. The auxiliary cores are supported adjacent the path of rotation of the permanent magnet field poles, so those field poles will magnetically couple the flux from the auxiliary cores into the main windings. The auxiliary cores are provided with an auxiliary set of polyphase windings to generate travelling or rotating magnetic field poles to rotate synchronously with the associated rotated pole pieces.

Since the flux supply of the permanent magnet of the generator is limited by its very nature, the losses in such a generator are especially important. An additional feature of this invention is the reduction of conventional losses caused by harmonic flux effects. The harmonic flux components of the various flux fields are confined and prevented from affecting the main flux fields and from saturating any portions of the magnetic circuits for the main flux. Thus, full use of the magnetic circuits is had by the main flux.

Thus by this invention, an electrically generated rotating flux field is synchronously rotated with, and added to, the mechanically rotated flux field from the permanent magnet pole pieces. The auxiliary windings are connected to, and energized from, the main stator windings in accordance with the load currents in those main windings, whereby the auxiliary flux field supplies enough new flux to compensate for the flux diverted by armature reaction of the load current against the main flux field.

The principles of the invention, and the manner in which it is applied and operates may be more readily understood upon reference to the accompanying drawings, in which FIGURE 1 is a schematic diagram of a polyphase permanent magnet generator, with harmonic suppressors indicated for the phase windings;

FIGURE 2 is a typical load-voltage curve of a generator as in FIGURE 1 and shows the drooping voltage characteristic under load;

FIGURE 3 is a schematic diagram of a three-phase generator winding arrangement for generating a travelling or rotating magnetic field;

FIGURE 4 is a schematic diagram of the generator winding arrangement of FIGURE 3 physically disposed adjacent the generator of FIGURE 1;

FIGURE 5 is a schematic diagram of the generator and the winding arrangement of FIGURE 4 electrically combined to relate the frequency of the rotating magnetic field to the frequency of the rotated magnet, to enable the rotating magnetic field to aid the main magnetic flux field;

FIGURE 6 is a schematic diagram similar to FIGURE 5, in which the energizing voltages for the auxiliary windings are derived from internal points on the main generator windings;

FIGURE 7 is a schematic diagram, similar to FIGURE 5, in which the energy for the auxiliary windings is derived from shunt circuits related to portions of the main generator windings in order to energize the auxiliary windings in accordance with a function of the load current in the main generator windings;

Figure 12:
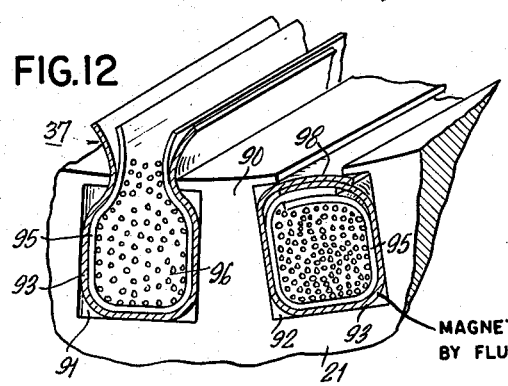
Figure 11:
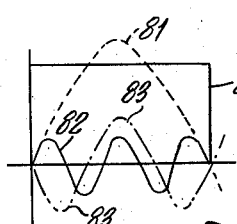

FIGURE 11 is a graph of a rectangular wave representative of a magnetic flux wave formation in the air gap from the pole pieces, and shows the first three terms of a Fourier series expansion defining the rectangular wave; and FIGURE 12 is a schematic end view of two slots of the slotted stator, and illustrates the application of magnetizable foil to wrap the coil sides to provide a closed restricting path for the harmonic flux components.

As shown in FIGURE 1, a permanent magnet generator or alternator 20 comprises a stator 21 and a rotor 22, symbolically indicated. The stator supports three stationary phase windings 23, 24 and 25, each including coils, appropriately distributed in proper electrical spacing for a three-phase winding, connected in Y or star relation. Here only a single magnet is indicated for a two-pole generator. The stator windings are connected to a load bus system 27.

The rotor 22 consists of a permanent magnet bar 30 with two pole pieces 31 and 32 of soft iron, all supported for rotation on a drive shaft 34 driven by an external means, such as a motor 35. The two pole pieces 31 and 32 are essentially salient poles, and the flux density curve of the flux field from each pole piece is relatively flat-top and rectangular or square.

Consequently, in accordance with the Fourier series expansion of a rectangular wave, the voltages induced in the stator windings will have components of higher frequency harmonics. In an alternator of this type, with a limited amount of flux available for excitation of the stator windings, the losses caused by the harmonics are particularly troublesome. Harmonic flux suppressors 37 are provided for the coils and coil sides of the several phase windings 23, 24 and 25, all of which will be described in more detail below.

As shown in FIGURE 2, the output voltages of the alternator have a drooping characteristic 40, falling away from the implied full voltage line 39, due to armature reaction of load current in the stator windings and due to saturation of the magnetic iron in the core for the stator, both of which cause a substantial reduction in the quantity of the magnetic flux from the pole pieces 31 and 32 that is available to induce the voltages in the stator windings.

In order to maintain the alternator output voltages at or near no-load values, additional flux is necessary for the stator windings 23, 24 and 25, and for that purpose, an auxiliary stator assembly is provided, having a set of polyphase windings 41, 42 and 43 to generate a travelling or rotating magnetic field 45, indicated symbolically in FIGURE 3 as having magnetic poles 46 and 47. Harmonic suppressors 37 are provided for the windings. The windings are shown energized from a suitable supply source 49.

FIGURE 4 is a schematic representation showing that the generator of FIGURE 1 and the auxiliary rotating field-producing assembly of FIGURE 3 are disposed for co-operative relationship. To achieve such relationship, the rotation of flux field 45 should be synchronous with the rotated magnet 30 of the rotor 22.

Such needed synchronism is established, as in FIGURE 5, by electrically connecting the auxiliary windings 41, 42 and 43 to the generator terminals or the output voltage system 27 of the main stator windings 23, 24 and 25.

Since the formation of a rotating magnetic field provides a uni-directional flux, such a flux may be generated as a function of the alternator voltage or the load current, and utilized to regulate the terminal voltages of the generator.

As shown in FIGURE 6, the auxiliary windings 41, 42 and 43 may be connected internally in the alternator to points on the main stator windings, as for example at the points 51, 52 and 53.

As shown in FIGURE 7, the auxiliary stator windings 41, 42 and 43 are not connected in Y with a common neutral, but are separate and are each individually connected to shunt a preselected portion of the main stator windings, identified as 23-A, 24-A and 25-A. The polyphase distribution of the auxiliary windings 41, 42 and 43 assures the formation of the rotating magnetic field 45 to energize the main stator windings. Here, all of the windings are also provided with the harmonic flux suppressors 37 of the previous arrangements.

In the arrangement shown in FIGURE 7, the auxiliary windings are energized by both a voltage function and current function of the main stator windings.

Figure 8:
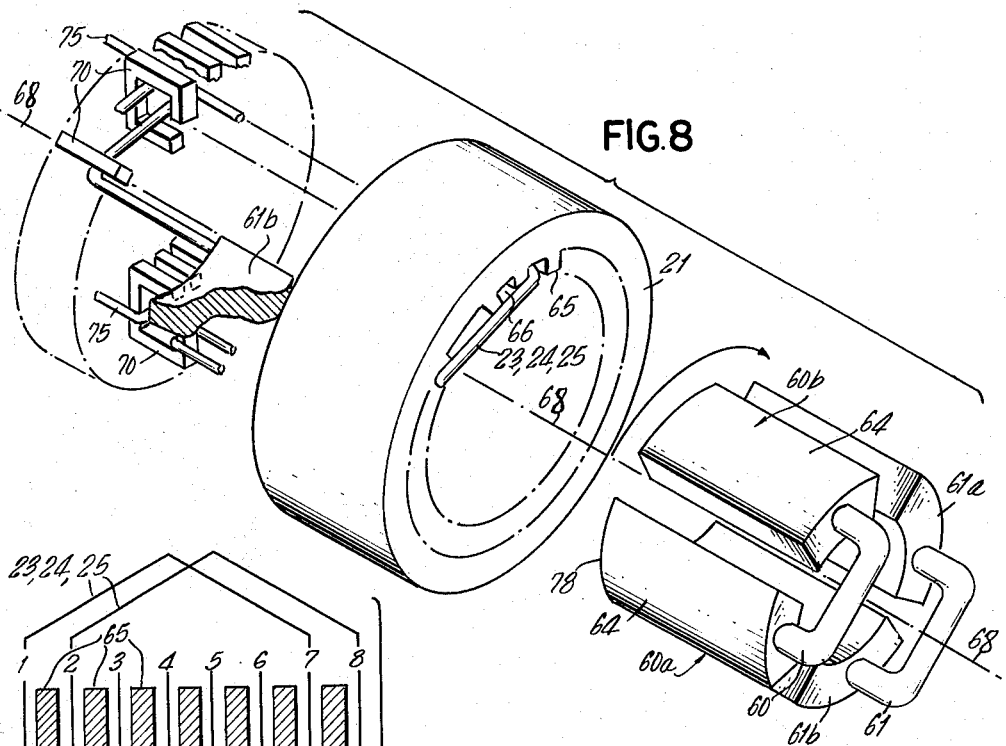
FIGURE 8 is a schematic exploded view of certain functional elements of a permanent magnetic generator of this invention, to indicate the relative form and disposition of the core elements for the auxiliary windings.
Figure 9:
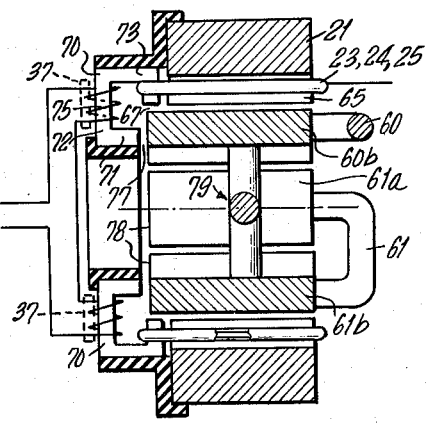
FIGURE 9 is a schematic sectional view of the elements of FIGURE 8 in assembled arrangement, and illustrates the disposition and magnetic coupling of the auxiliary core elements with the stator winding coils and the pole pieces of the magnets on the rotor.

In FIGURES 8 and 9, are shown some details of construction of the rotor, the main stator and the auxiliary stator, for a four-pole machine with twenty-four slots. The rotor magnets 60 and 61 are merely indicated, since their actual structure and support on the rotor are not directly material to this description. A simple non-magnetic supporting spider 79 is indicated. The two rotor magnets 60 and 61 are provided with pole pieces 60-A and 60-B, and 61-A and 61-B.

The pole pieces are shaped as elements of a cylinder with their external surfaces 64 of arcuate shape of the same curvature as the inner peripheral outline of the teeth 65 and slots 66 of the stator core 21, around an axis 68. In assembly and operation, a pole surface 64 is spaced from teeth 65 by an air gap 67. The pole pieces are axially long enough to extend slightly beyond the stator core 21 to serve as a magnetic armature or flux conductor for the auxiliary core element 70, as shown in FIGURES 8 and 9.

The auxiliary core elements 70 are essentially individual teeth in their function relative to the main stator windings. The number of core elements 70 corresponds to the number of teeth in the stator 21. Each core element 70 has a base 71, a vertical side 72 and a top L-shaped piece 73, which functions as a tooth, and an energizing coil 75 provided with the harmonic suppressor 37.

The auxiliary teeth 73 are substanially butted against the main teeth 65 of the stator core 21, and are spaced from the arcuate surfaces 64 of the pole pieces by the same air gap space 67. The end turns of the main stator windings 23, 24 and 25 enfold each auxiliary tooth 73 as if it were part of the adjacent main tooth 65 of the main stator core 21. Thus, flux from the auxiliary tooth 73 interlinks the adjacent coil of the main stator winding in parallel with the main flux field from the rotated pole pieces.

However, it is important that the main flux field from the pole pieces shall not enter the auxiliary teeth 73 to induce a voltage in the auxiliary coils and phase windings 75. Only the flux generated in the auxiliary teeth 73 is to be effective between the auxiliary cores 70 and the pole pieces 60-A and 60-B, or 61-A and 61-B, for magnetic coupling with the adjacent coil of the main stator winding 23, 24 or 25.

That uni-directional transfer of flux from the auxiliary core to the main winding is one of the features of this invention that makes the regulation control possible.

Instead of the auxiliary core teeth being mounted all as part of a unit core structure, as in the stator core, each auxiliary tooth 73 is part of an individual core 70, which is so disposed, as in FIGURES 8 and 9, that each rotated pole piece 60-A, 60-B, 61-A and 61-B will pass between each tooth 73 and its base 71 to complete the magnetic circuit of each auxiliary tooth 73 through the air gap 67 and a back air gap 77 at the front end face 78 of each pole piece.

The magnetic potential of each pole piece is the same at both air gaps 67 and 77 and there is no potential gradient from a pole piece to establish a magneto-motive force through any auxiliary core 70. Each auxiliary core is therefore unaffected by the pole pieces, and the magnetic action between auxiliary core 70 and the pole pieces remains uni-directional, from the core 70 to the associated coil of the stator winding.

Figure 10:
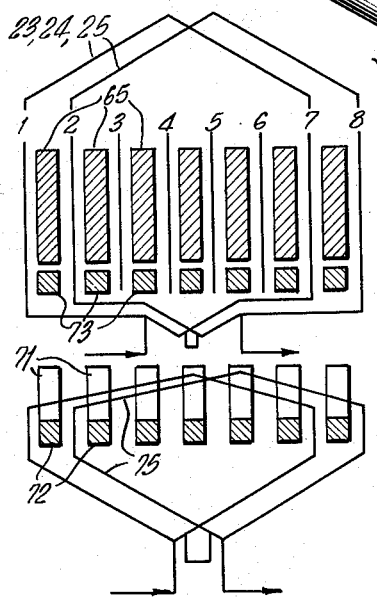
FIGURE 10 is a schematic coil layout for one phase winding of the main stator windings and for a corresponding phase winding of the auxiliary core windings.

To achieve a rotating magnetic field by the auxiliary cores 70, the cores are considered and treated as teeth, and are spaced as in FIGURE 8, in circular arrangement, to provide coil separating spaces similar to slots in a unit construction. The auxiliary coils 75 are then disposed as regular phase windings to enfold the cores in pole phase groups similar to the conventional arrangement in a unitary core structure, as in the stator. The winding arrangements for one main stator phase winding and for one auxiliary core phase winding of a pole phase group are indicated in FIGURE 10.

Although the phase winding arrangement appears to be the same for both the main stator windings and the auxiliary core windings, the important feature here is that the magnetic potential gradient is in a different direction in each of those two cases. In the main stator the magnetic potential gradient is circumferential, while in the auxiliary cores the gradient is in a plane perpendicular to the path of the main gradient.

Thus the auxiliary cores electrically develop a rotating magnetic field having four field poles which rotate synchronously with the four mechanically driven and rotated pole pieces of the main magnets 60 and 61.

The energization of the auxiliary core windings is derived from the main stator windings to provide the type of supplemental flux needed for the regulation desired.

In the showing in FIGURE 10, the teeth 73 of the several auxiliary cores 70 have been spaced apart from their vertical and base portions 71 and 72 for clarity, to provide extra space to show the windings 75 for those auxiliary cores. Only one coil group of two coils for a pair of poles for one phase is shown for the main stator and for the auxiliary cores. The coil arrangements and connections follow conventional rules for phase dispositions.

Obviously, the auxiliary core windings may be energized by voltages and currents derived from suitable points in the system outside of the generator itself, to provide the rotating magnetic field for the supplemental flux. Such voltages could be, for example, the deviation or droop voltage to provide a direct function of error to be compensated. Similarly, a current function could be derived from an external circuit element to provide suitable compounding energy to the auxiliary windings to develop the flux needed to restore voltage drop due to load or saturation.

The arrangement of the phase coils in FIGURE 10 is to illustrate that conventional coil layins may be utilized, but not necessarily that the primary coils and the auxiliary coils are connected phase to phase. The phase terminal connections of the auxiliary windings will dictate the relative disposition of cooperating auxiliary phase windings relative to the primary phase windings.

The feature of harmonic suppression may now be considered.

As previously mentioned, the salient pole construction of the field poles of the magnets 60 and 61 and the tooth and slot construction of the stator core establish a step, or rectangular, flux wave formation with relatively flat-top. Such a wave form may be represented by the rectangular wave 80 of FIGURE 11. Such a rectangular wave form may be defined by a Fourier series expansion of which only the first three terms are shown, the fundamental frequency term or component 81, a third harmonic 83 and a fifth harmonic 82. The additional harmonics are present although not indicated.

In any dynamo-electric machine, it is desired that the flux across the air gap be sinusoidal in order to induce better voltage wave form. The presence of harmonics not only prevents induction of sinusoidal voltages, but also causes excess losses and consequent need for greater magnetizing current. The result is decreased efficiency and internal power factor. Harmonics in the air gap leads to harmonics in the output voltages.

The harmonic flux components saturate the edges of the teeth and core body around the slot containing the current conductors. This causes increased hysteresis losses and reduces the area of tooth section available for flux conduction. More current is needed for the increased magneto-motive force necessary.

By means of the harmonic suppressor 37, shown schematically as applied to the windings in the various diagrams of FIGURES 1 to 7, the harmonic flux components are kept out of the teeth and core, and out of the air gap.

A typical construction showing the invention applied to a stator coil, for example, is shown in FIGURE 12. The stator core 21 is provided with a series of teeth 90 and slots, of which two slots 91 and 92 are shown to illustrate the manner of applying the invention.

In slot 91, for example, a layer of thin magnetizable metalic foil 93 is laid in loosely in the slot. A layer of paper insulation 95 is then laid in loosely on the foil, as shown. Then the coil sides or wires 96 of one coil of a phase winding are placed in the channel in the insulation 95. The coil sides 96 may be wrapped as a set or left loose, according to the insulation on the wire.

After the set of coil sides 96 is laid in the paper 95, the two sides of the paper are folded over to encircle the coil sides and the foil is then similarly folded over to establish a closed magnetic circuit. Where insulation lining is used, it is then folded over to wrap the foil and coil sides. A suitable slot closure 98 may be placed under the tooth extensions to hold the coil sides and wrappings in place.

The operation of the foil wrapping 93, identified as the harmonic suppressor 37, results from the absorption of the harmonics by the foil to saturation. The permeability of the foil then drops so low the foil looks like air to the fundamental flux component. Thus, the harmonics are kept out of the teeth and core and out of the air gap, with corresponding benefits in reduced losses and reduced magnetizing currents.

Where an open slot formation is available, the entire coil may be first wrapped with the magnetizable foil and insulating paper or fabric before placement into the slots. The foil may be insulated from the core body and tooth edges, but need not be, since the foil is both physically and magnetically separate in its operation.

Thus, the invention herein provides a novel permanent magnet generator having an arrangement for effectively compounding the field energization to enable the generator to automatically regulate its output voltage to compensate for loss of voltage due to armature reaction and load.

An important feature of this novel principle of field regulation is that the interaction of the auxiliary rotating magnetic field and the flux field of rotated pole pieces of the main magnets is established through the pole pieces themselves, so no external field effect is impressed on the magnets themselves that would otherwise weaken them.

The invention has been disclosed in a most general sense. It is obvious that it may be variously applied without departing from its spirit and scope as indicated herein and in the claims.

What is claimed is:

1. A permanent magnet generator comprising
   (a) a rotor having an axis of rotation and embodying a pair of elongated permanent magnets longitudinally disposed and supported parallel to the axis of rotation for rotation around said axis,
   (b) a magnetizable connector between the back ends of the pair of magnets, and
   (c) a pole piece of soft iron at the front end of each magnet;
   (d) a stator including main distributed polyphase stator windings spaced from the rotor pole pieces by a fixed air gap, the windings being distributed and arranged to generate polyphase voltages in response to relative movement of the rotor magnet pole pieces past said stator windings; and
   (e) auxiliary polyphase winding means energized from and responsive to the polyphase voltages from said main stator windings and operative to generate a moving flux field for controlling the divergence of flux from the soft iron pole pieces.

2. A permanent magnet generator comprising
   (a) a rotor having an axis of rotation and embodying a pair of elongated permanent magnets longitudinally disposed and supported parallel to the axis of rotation for rotation around said axis,
   (b) a magnetizable connector between the back ends of the pair of magnets, and
   (c) a pole piece of soft iron at the front end of each magnet;
   (d) a stator including distributed polyphase stator windings spaced from the rotor pole pieces by a fixed air gap, the windings being distributed and arranged to generate polyphase voltages in response to relative movement of the rotor magnet pole pieces past said stator windings; and
   (e) means energized from the stator polyphase windings for generating a travelling magnetic flux field to move with and stay adjacent to and traverse each pole piece on the rotor, independently of the magnetic path through each magnet, thereby controlling the amount of flux from the pole pieces that links the stator windings.

3. A permanent magnet generator comprising
   (a) a rotor having an axis of rotation and embodying a pair of elongated permanent magnets longitudinally disposed and supported parallel to the axis of rotation for rotation around said axis,
   (b) a magnetizable connector between the back ends of the pair of magnets, and
   (c) a pole piece of soft iron at the front end of each magnet;
   (d) a stator including distributed polyphase stator windings spaced from the rotor pole pieces by a fixed air gap, the windings being distributed and arranged to generate polyphase voltagess in response to relative movement of the rotor magnet pole pieces past said stator windings; and
   (e) means including a set of auxiliary stator polyphase windings electrically connected to the main stator windings to generate a travelling magnetic flux field moving with the rotor and relatively stationary relative to each rotor pole piece.

4. A permanent magnet generator comprising
   (a) a rotor having an axis of rotation and embodying a pair of elongated permanent magnets longitudinally disposed and supported parallel to the axis of rotation for rotation around said axis,
   (b) a magnetizable connector between the back ends of the pair of magnets, and
   (c) a pole piece of soft iron at the front end of each magnet;
   (d) a stator including distributed polyphase stator windings spaced from the rotor pole pieces by a fixed air gap, the windings being distributed and arranged to generate polyphase voltages in response to relative movement of the rotor magnet pole pieces past said stator windings; and
   (e) means including a set of auxiliary stator polyphase windings electrically connected to the main stator windings to generate a travelling magnetic flux field moving with the rotor and relatively stationary relative to each rotor pole piece; and
   (f) means controlling the excitation of the auxiliary windings for controlling the amplitude of the travelling magnetic flux field adjacent each rotor pole piece.

5. A permanent magnet type generator comprising
   (a) a permanent magnet rotor;
   (b) a main stator having distributed polyphase windings thereon to be energized by the rotor to generate a polyphase voltage; and
   (c) an auxiliary stator having distributed polyphase windings to be energized from the main stator windings in corresponding phase sequence to generate a travelling magnetic pole that will move with and stay adjacent a fixed volume of the rotor to modify the magnetic character of said rotor volume, to thereby control the effect of the rotor magnet in passing magnetic flux in a predetermined direction through said fixed volume of the rotor.

6. A permanent magnet generator comprising
   (a) a rotor supported for rotation around a main axis;
   (b) a permanent magnet structure mounted on the rotor for rotation therewith around said axis;
   (c) a pair of pole pieces supported on the rotor in physical and magnetic relation to the magnet structure, to constitute pole pieces of opposite polarity for the magnet structure, each of the pole pieces having a front face surface in a plane transverse to the main axis and each pole piece having an arcuate peripheral surface constituting a portion of a virtual cylinder concentric with said main axis;
   (d) a first stator structure of magnetizable material;
   (e) a first set of polyphase windings to generate a polyphase set of voltages, and supported in distributed relationship on said first stator structure in position to be cut by the magnetic flux field extending between a corresponding set of surfaces on the pair of pole pieces;
   (f) a second stator structure; and
   (g) a second set of polyphase windings supported in distributed relationship on said second stator, said second set of windings being electrically energized from said first set of windings to develop an auxiliary travelling magnetic flux field pole moving with and adjacent to each rotor pole piece, and each such auxiliary field pole being of a polarity corresponding to the polarity of the adjacent rotor pole piece, and each such auxiliary field pole travelling with said rotor pole piece and being positioned to aid the fixed magnetic flux field entering the pole piece from the associated rotor magnet structure.

7. A permanent magnet generator comprising
   (a) a permanent magnet structure having two ends of opposite magnetic polarity;
   (b) a pole piece for each end of the magnet structure for transmitting the magnetic flux from the magnet structure;
   (c) a rotor for supporting the magnet structure and the pole pieces symmetrically for rotation about an axis of rotation;
   (d) a magnetizable stator supporting a set of polyphase windings to be energized by the magnetic flux field diverging from the rotating pole pieces; and
   (e) auxiliary polyphase winding means energized from the polyphase windings for adding a rotating magnetic pole flux to the rotating pole pieces to increase the flux diverging from the rotating pole pieces to energize the polyphase windings.

8. A dynamo-electric machine of the permanent magnet field type, comprising
(a) a rotor embodying permanent-magnet means to establish and maintain a magnetic flux field, and to rotate said field around an axis of rotation;
(b) a stator structure spaced from the rotor by a fixed air-gap and supporting distributed phase windings arranged to constitute a polyphase winding to be energized by the rotating flux field from the rotor; and
(c) auxiliary polyphase winding means energized from the stator windings for supplementing the flux field from the rotor.

9. A dynamo-electric machine of the permanent magnet field type, comprising
(a) a rotor embodying permanent-magnet means to establish and maintain a magnetic flux field, and said rotor serving to rotate said field around an axis of rotation;
(b) a stator structure spaced from the rotor by a fixed air-gap, and supporting distributed phase windings arranged to constitute a polyphase winding to be energized by the rotating flux field from the rotor; and
(c) auxiliary polyphase winding means energized from the stator windings in corresponding phase sequence of the voltages in the stator winding for generating an auxiliary flux field to supplement the rotor flux field and to control the flux field across the gap between the rotor and the stator.

10. A dynamo-electric machine of the permanent magnet type, comprising
(a) a rotor embodying permanent-magnet means to establish and maintain a magnetic flux field, and said rotor serving to rotate said field around an axis of rotation;
(b) a stator structure spaced from the rotor by a fixed air-gap and supporting distributed phase windings arranged to constitute a polyphase winding to be energized by the rotating flux field from the rotor; and
(c) an auxiliary polyphase winding energized from the stator windings to supplement the rotor field and control the total flux field from the rotor to the stator.

11. A dynamo-electric machine comprising
(a) a rotor carrying means to establish a flux field of fixed polarity;
(b) a stator having a polyphase winding in the path of the rotor flux field to have polyphase voltages generated therein; and
(c) auxiliary polyphase winding means responsive to the voltages generated in the stator windings for supplementing the quantity of flux from the rotor to control the total flux to link the stator windings.

12. A dynamo-electric machine comprising
(a) a rotor carrying means to establish a flux field of fixed polarity;
(b) a stator having a polyphase winding in the path of the rotor flux field to have polyphase voltages generated therein; and
(c) auxiliary polyphase winding means energized from the stator polyphase winding for generating a traveling flux field to combine with the rotating flux field of the rotor to control the total quantity of flux across the air gap between the rotor and the stator windings.

13. A permanent magnet generator comprising
(a) a rotor carrying a permanent magnet structure supported for rotation about an axis to establish a rotating magnetic flux field;
(b) a main stator core encircling the rotor and supporting a set of distributed polyphase windings to be linked by the rotating flux field of the rotor magnet structure;
(c) an auxiliary stator core supporting a set of auxiliary polyphase windings to be energized from the main stator windings to generate a travelling magnetic flux field; and
(d) means for directing the flux from the travelling flux field to aid the flux from the rotating flux field in linking with the main stator windings.

14. A permanent magnet generator comprising
(a) a rotor rotatable about a main axis;
(b) a permanent magnet supported on said rotor and having a pole piece movable by said rotor in a circular path in a plane transverse to the axis;
(c) a stator consisting of a magnetizable core having a set of polyphase distributed windings adjacent the circular path of said pole piece, the stator core and windings being effective to establish a magneto-motive force gradient in said plane that contains the circular path of the pole piece; and
(d) an auxiliary stator consisting of core elements and distributed windings disposed axially around and adjacent said path to establish magneto-motive force gradients in axial planes perpendicular to said plane that contains said circular path.

15. A permanent magnet generator comprising
(a) a rotor carrying a permanent magnet having a pole piece disposed to direct a magnetic flux field from the magnet in a radial direction from an exit surface of the pole piece, the pole piece being movable in a circular path;
(b) a set of polyphase distributed windings peripherally disposed around said circular path to be energized by the flux field from said exit surface; and
(c) auxiliary polyphase winding means for introducing an auxiliary magnetic flux field into said pole piece through a different surface of said pole piece and directing such added flux through the pole piece in a direction to aid the flux field from the permanent magnet.

16. A permanent magnet generator as in claim 15 in which
the auxiliary flux introducing means consists of an auxiliary core magnetically interlinked with the polyphase windings; and
an auxiliary set of windings to energize the core to establish a travelling magnetic field.

17. A permanent magnet generator comprising
(a) a main generator stator with a three-phase distributed winding;
(b) a rotor carrying a permanent magnet and rotatable by external motive means to rotate the permanent magnet and its field past the stator winding to induce a polyphase set of voltages in the stator winding;
(c) an auxiliary stator with a three-phase distributed winding;
(d) means connecting said auxiliary three-phase winding to the main generator winding to generate a rotating magnetic field in synchronism with the rotated permanent magnet field; and
(e) means coupling said auxiliary winding to said main winding for magnetically coupling and adding the electrically generated rotating field to the mechanically rotated permanent magnet field in energizing the main generator winding.

18. A permanent magnet generator comprising
(a) a main generator stator with a three-phase distributed winding;
(b) a rotor carrying a permanent magnet and rotatable by external motive means to rotate the permanent magnet and its field past the stator winding to induce a polyphase set of voltages in the winding;
(c) an auxiliary stator with three separate phase windings, spaced 120 electrical degrees apart in polyphase winding distribution with their terminals free;

(d) means connecting each auxiliary phase winding in shunt to a portion of each main phase winding, so the auxiliary phase winding will be energized by a voltage component and by a load current component from the main phase winding, the three auxiliary phase windings being connected in appropriate sequence to the main phase windings to enable the auxiliary windings to develop a rotating magnetic field moving in the same direction as, and synchronous with, the rotated permanent magnet field; and (e) means for magnetically coupling the synchronous rotating field with the rotated permanent magnet field.

19. A permanent magnet generator, as in claim 18, in which the main three-phase windings and the auxiliary three-phase windings have all their coil turns including coil sides in core slots and end turns beyond the core all encircled in thin magnetizable foil of limited section and saturable by the harmonic flux components of the flux fields encircling the respective coil sides.

20. A permanent magnet generator comprising
(a) a stator core of annular laminations with radial teeth and slots on their internal periphery;
(b) a three-phase winding distributed in the slots of said stator core;
(c) a rotor consisting of a permanent magnet structure with pole pieces at the ends of the permanent magnet structure, each pole piece having an arcuate peripheral surface and a flat end surface, the peripheral surfaces being spaced from the stator core by a narrow air gap during operation;
(d) an auxiliary stator core structure consisting of a plurality of substantially C-shaped elements positioned adjacent the path of rotation of the pole pieces and disposed to be magnetically coupled to said pole pieces during their rotation, and (e) windings on said auxiliary core elements to generate a rotating magnetic field.

21. A permanent magnet generator, comprising
(a) a main stator core of tooth and slot construction;
(b) a set of main output windings distributed in said slots;
(c) a rotor carrying two magnets and four pole pieces for moving their flux fields past the primary windings;
(d) an auxiliary tooth structure adjacent each main core tooth and in position to be magnetically coupled with the pole pieces as the pole pieces are rotated past each auxiliary tooth;
(e) means for energizing the auxiliary tooth structures; and
(f) means for controlling the magnetic potential gradient between the auxiliary teeth and the pole pieces to be uni-directional and to oppose any diverging flux from any pole piece to any auxiliary tooth.

References Cited by the Examiner

UNITED STATES PATENTS

| | | | |
|---|---|---|---|
| 1,412,933 | 4/22 | Gordon | 322—90 |
| 1,473,900 | 11/23 | Bushnell | 322—90 |
| 2,165,976 | 7/39 | Mandl | 322—46 |
| 2,432,117 | 12/47 | Morton | 310—156 |
| 2,564,320 | 8/51 | Brainard | 322—46 |
| 2,677,776 | 5/54 | Kohlhagen | 310—156 |
| 2,713,128 | 7/55 | Toffolo | 310—180 |
| 2,767,368 | 10/56 | Kober | 322—46 |

LLOYD McCOLLUM, *Primary Examiner.*

MILTON O. HIRSHFIELD, ORIS L. RADER,
*Examiners.*